W. WESTLAKE.
Lantern.
No. 2,239.
Reissued May 8, 1866.
Fig. 2,
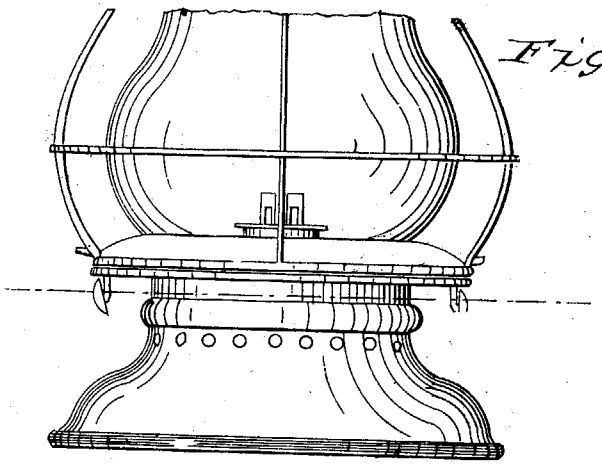
Fig. 4,
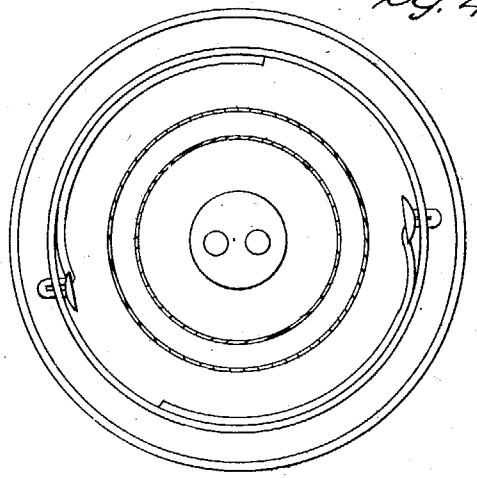
Fig. 1,
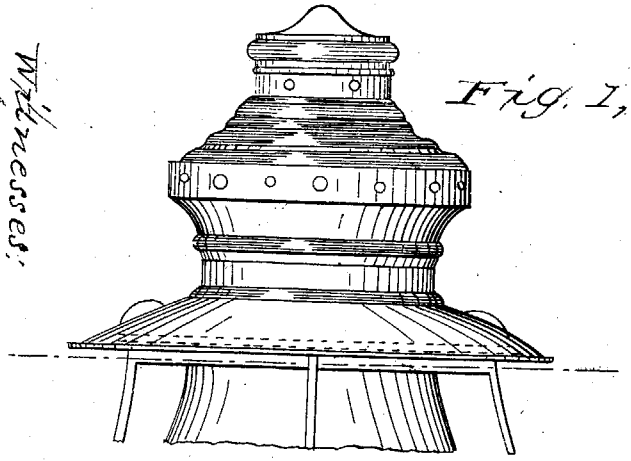
Fig. 3,
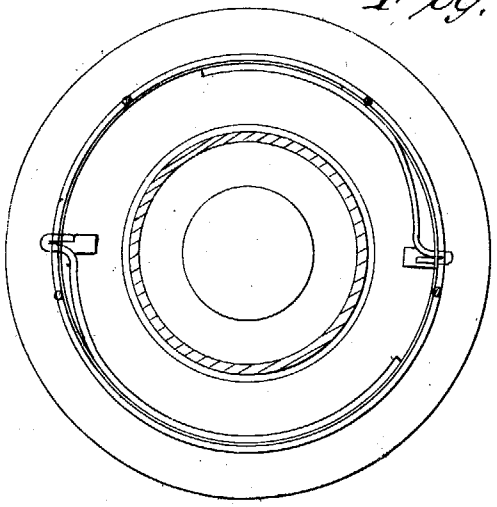
Witnesses:
T. Smith
L. Jones.
Inventor:
Wm Westlake
by Atty Thos. T. Crump
N. PETERS, Photo-Lithographer, Washington, D. C.

UNITED STATES PATENT OFFICE.

WILLIAM WESTLAKE, OF CHICAGO, ILLINOIS, ASSIGNOR TO JAMES E. CROSS, JAMES F. DANE, AND WILLIAM WESTLAKE.

IMPROVEMENT IN LANTERNS.

Specification forming part of Letters Patent No. 51,526, dated December 12, 1865; Reissue No. 2,239, dated May 8, 1866.

*To all whom it may concern:*

Be it known that I, WILLIAM WESTLAKE, of the city of Chicago, in the county of Cook and State of Illinois, have invented certain new and useful Improvements in Lanterns; and I do hereby declare that the following is a full, clear, and exact description of the same, reference being had to the accompanying drawings, and to the letters and marks thereon, which said drawings form a part of this specification and show how my invention may be carried out and rendered practically valuable.

My invention relates to the manner of connecting the lantern-guard to the body of the lantern. Before the date of my invention the guard had, as the main means for making such connection, a band, disk, or hoop of metal. An important objection to the use of such band or hoop for the purpose herein involved is its liability to be bent or indented, and when so bent is rendered an obstacle to the attaching of the lantern to the guard as any deviation from the curved or circular line common to the band, disk, or hoop or the rim of the lantern will prevent the fitting of one to the other. Other objections exist against the use of the band or hoop for this connecting purpose, among which are its weakness and the space it occupies. This band or hoop must bear the entire weight of the lantern, and hence it must be strong and durable, and yet not be of greater weight than is necessary and occupy the smallest possible space. A rod or tube presents the strongest form of metal in the least space. A rod or tube will therefore make the best connecting means between the guard and the lantern; and my invention consists in using the rod or tube instead of the band, disk, or hoop.

The drawings of this application show by Figure 1 the spring-catches of the flange of the dome, making the connection between the lantern and the rod of the guard at the upper end of the guard. Fig. 3 is a view of the dome inverted, exhibiting the upper connection by a horizontal section taken on the red line of Fig. 1, while Figs. 2 and 4 show the connection as made by the spring-catches of the flange of the bottom or lamp part of the lantern and the lower rod of the guard. Figs. 1 and 3 show one form of a lantern with the guard-connection at the top, while Figs. 2 and 4 show another form of a lantern with the connection at the bottom, both connections not being used in the same lantern.

As is evident, however, different catches than those here shown may be used, and the middle rod or additional rods or tubes may be used for making this connection, and at points varying from those shown.

To enable others skilled in the art to make and use my invention, I will proceed to describe its construction and operation or the construction and operation of a lantern to which my invention is applied.

The dome of the lantern, Fig. 1, is made in any of the known forms, and when the round rod connection is made at the top the base is made in any of the ordinary forms and the guard firmly attached to such base or lamp part, and the connection is made by the use of springs, as shown at Fig. 3. When the connection is made at the base, as shown at Fig. 2, the guard is firmly attached to the dome and springs are inserted in the base, as shown at said Fig. 2 and at Fig. 4. The springs pass over the rod when the connection is made at the bottom and under when at the top.

As one of the objects of having lantern guards detachable is to enable parties to remove the globe for purposes of cleaning and replacing in case of breakage, it will be obvious that the globe is to be loosely attached at both ends, whether the connection by the rod formed into proper rings and the springs is made at the top or bottom of the guard.

The rings are usually made of No. 11 wire.

What I claim as my invention, and desire to secure by Letters Patent, is—

Connecting the dome or lamp part of a lantern to the guard by means of a ring or rod of the guard and the spring-catches or their equivalents, substantially as and for the purposes herein shown and specified.

WILLIAM WESTLAKE.

Witnesses:

L. L. BOND,

E. A. WEST.